H. L. Morse,
Turning Lathe,
Nº 63,928.   Patented Apr. 16, 1867.
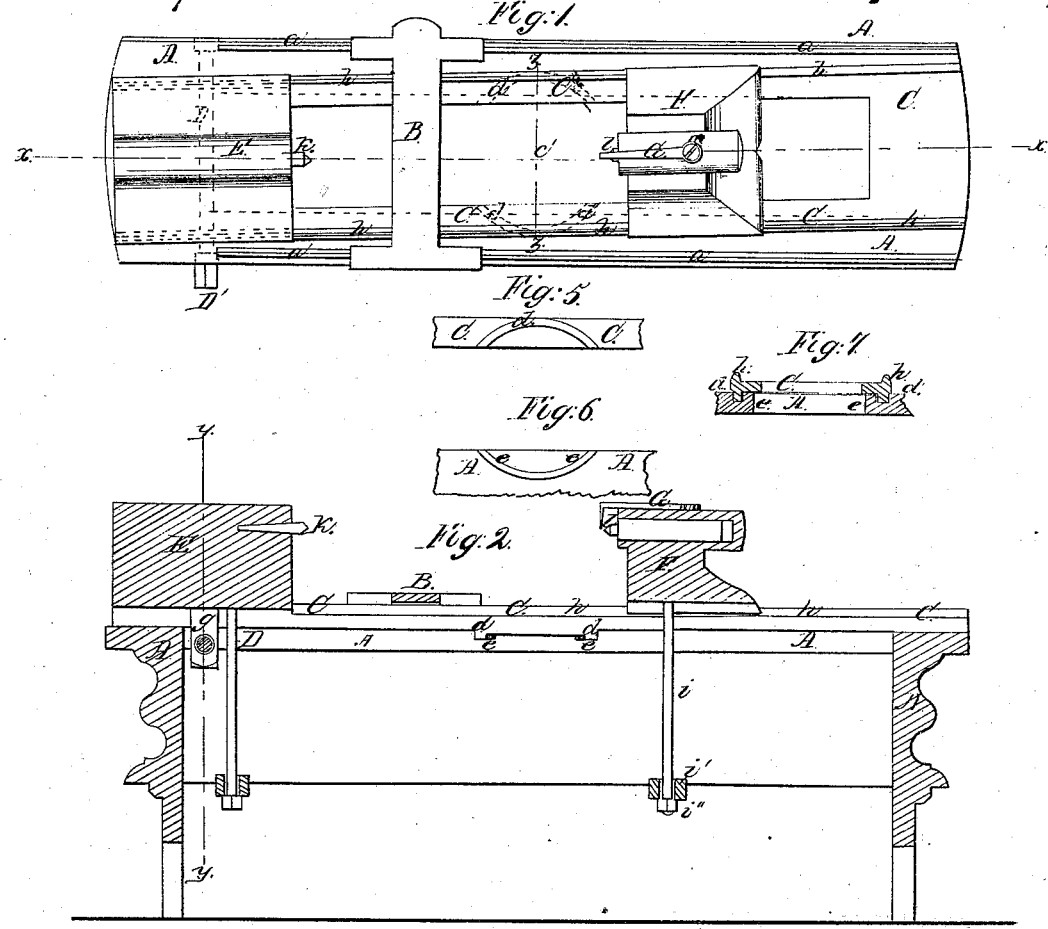
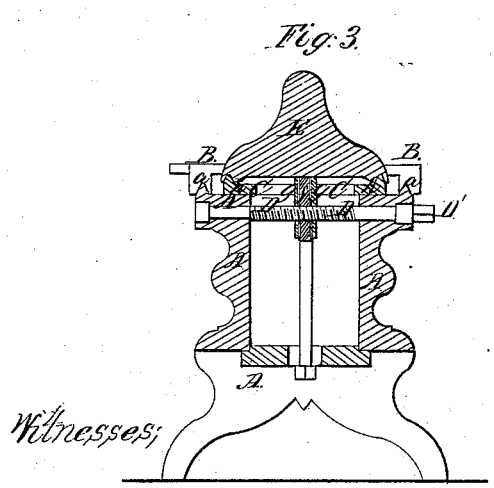
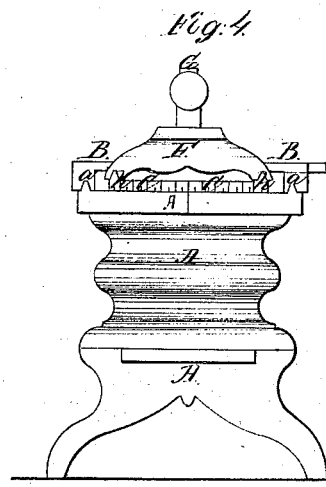
Witnesses:   Inventor:

United States Patent Office.

H. L. MORSE, OF NEW BEDFORD, MASSACHUSETTS, ASSIGNOR TO S. A. MORSE, OF SAME PLACE.

Letters Patent No. 63,928, dated April 16, 1867.

IMPROVEMENT IN TURNING-LATHES.

*The Schedule referred to in these Letters Patent and making part of the same.*

TO ALL WHOM IT MAY CONCERN:

Be it known that I, H. L. MORSE, of New Bedford, in the county of Bristol, and State of Massachusetts, have invented a new and useful Improvement in Lathes; and I do hereby declare that the following is a full, clear, and exact description thereof, which will enable others skilled in the art to make and use the same, reference being had to the accompanying drawings, forming part of this specification.

The object of this invention is to construct a lathe on which straight work may be turned as well as tapering, and the latter as good as the former.

In the lathe now generally in use, straight work could be well done; but for doing tapering work the foot-stock was adjusted laterally. This would have worked very well if the centre pins would not thereby have been brought out of their relative positions. The head-stock remaining stationary, its centre pointed in the old direction, that is, in line with the longitudinal centre line of the lathe, while the centre of the foot-stock, having been brought out of the centre line of the lathe, pointed towards the centre of the head-stock. It was, consequently, perfectly impossible to neatly secure the material to such a lathe for tapering work. Another defect of the old lathes consisted in the omission of a proper gauge for adjusting the tool to the work. There was, generally, an adjustable rest provided, but that could not be made use of with sufficient accuracy, as the tool was being worn out and had to be resharpened. The difference thus occasioned in the length of the tool made a really exact readjustment of the rest impossible, unless there was a proper gauge, by means of which the original position of the tool could always be ascertained and retained.

My invention completely overcomes all these difficulties. It consists, first, in securing to the top of the lathe a plate which cannot be moved either length or sideways, but which turns on an imaginary centre in the middle portion of the lathe. The head-stock is rigidly secured to this plate. The foot-stock slides on it longitudinally. The plate is turned by means of a crank operating a screw on the head end of the plate. An index at the foot end of the lathe enables a very accurate adjustment of the plate. The carriage, with the tool-rest, slides independently of the movable plate on the lathe itself, and retains its original direction under all circumstances. By turning the upper plate it will be understood that both the stocks being attached to the same, their respective centres will point exactly towards each other. The angle of taper being ascertained by the aid of the index, the work can be very accurately performed. The carriage and rest always remain in a direction which is at right angles with the longitudinal centre line of the lathe. My invention consists, second, in the attaching a gauge to the foot-stock, whereby the original position of the tool can at once and at all times be ascertained.

Having stated the nature of my invention, I will now proceed to describe its construction and operation, reference being had to the accompanying drawings, in which—

Figure 1 represents a plan or top view of my improved lathe.

Figure 2 is a vertical longitudinal section of the same taken on the line $x\,x$, fig. 1.

Figure 3 is a vertical cross-section taken on the line $y\,y$, fig. 2.

Figure 4 is a rear elevation of the same.

Figure 5 is a portion of a bottom view of the upper movable plate.

Figure 6 is a portion of a top view of the original lathe table A.

Figure 7 is a cross-section of the table A and movable plate, taken on the line $z\,z$, fig. 1.

Similar letters of reference indicate like parts.

A is the lathe table, made as usual, and of suitable material. Along its upper longitudinal edge are arranged flanges $a\,a$, on which the tool-rest B slides. C is the movable and adjustable plate. This turns on an imaginary centre $c$, fig. 1, by means of segments of circular projections $d$, fig. 5, at its under side, fitting in segments of circular grooves $e$, fig. 6, in the upper surface of the table A. The plate C is turned on the said centre $c$ by means of a screw, D, operated by a crank attached to the end D' of the screw. The said screw operates the upper plate by means of a nut, $f$, fig. 3, which is held stationary between two plates $g\,g$, secured to the under side of the plate C. By turning the screw D, the plate C will turn around the centre $c$. A scale (shown in fig. 4) at the rear end of the table and plate, which are formed in accordance with the line of a segment of a circle struck from the point $c$, will act as an index, and permit the adjustment of the upper plate to the necessary taper. The head-stock E is secured to the plate C. The foot-stock F slides on flanges $h$ on the plate C, and is held in position by means of the bolt $i$, bar $i'$, and nut $i''$. In whatever direction the plate C may be turned, the stocks will follow its movements, and their respective centres $k$ and $l$ will always point towards each other. A gauge. G, is attached to the top of the foot-stock F by means of a pivoting pin, $m$. It consists of a metal bar, turned down at its forward end in a right angle, as seen in fig. 2. To the point of this gauge the tool must be set at the beginning of the work; and whatever loss of the length of the tool may be occasioned by wearing off and grinding, the point of the tool will always be in the original position, if always set according to the point of this gauge. If found practicable, the head-stock may also slide on the plate C, as well as the foot-stock. It will then be secured in a manner similar to that by which the foot-stock is secured. The operation of the lathe will be the same.

Having thus described my invention, I claim as new, and desire to secure by Letters Patent—

1. The method of adjusting the movable plate C, consisting of a combination with each other of the circular projections $d\,d$, grooves $e\,e$, screw D, and nut $f$, substantially as herein shown and described.

2. The arrangement of the scale or index to the rear end of the lathe-bed, in combination with the adjustable plate C, substantially as shown and described for the purposes herein set forth.

3. The gauge G, constructed of a right-angular bar, pivoted to the foot-stock F, in combination with the adjustable plate C, and adapted for the purpose described, when the tool is "set" to the point of its shorter arm, as herein specified.

H. L. MORSE.

Witnesses:
WILLIAM H. BLISS,
STEPHEN H. BRIGGS.